United States Patent
Sakamoto

(10) Patent No.: US 6,752,275 B2
(45) Date of Patent: Jun. 22, 2004

(54) EXTRACTION BAG WITH SUPPORT FOR CONTAINING A MATERIAL TO BE EXTRACTED AND SHEET COMPOSITE THEREFOR

(76) Inventor: Michiko Sakamoto, Zama Heights 4-1415, 4-2923-7, Iridani, Zama-shi, Kanagawa (JP), 228-0024

( * ) Notice: Subject to any disclaimer, the term of this patent is extended or adjusted under 35 U.S.C. 154(b) by 156 days.

(21) Appl. No.: 10/182,749

(22) PCT Filed: Jan. 31, 2001

(86) PCT No.: PCT/JP01/00680

§ 371 (c)(1),
(2), (4) Date: Jul. 30, 2002

(87) PCT Pub. No.: WO01/56439

PCT Pub. Date: Aug. 9, 2001

(65) Prior Publication Data

US 2003/0000889 A1 Jan. 2, 2003

(30) Foreign Application Priority Data

Jan. 31, 2000 (JP) .......................... 2000-027336

(51) Int. Cl.⁷ .......................... B01D 29/11; A47J 31/00
(52) U.S. Cl. ................ 210/455; 210/479; 210/483; 426/82; 426/108; 99/323; 99/304; 99/323.3
(58) Field of Search ............... 210/473, 474, 210/483, 478, 484, 249, 455; 426/108, 82; 99/323, 323.3, 306

(56) References Cited

U.S. PATENT DOCUMENTS 4,560,475 A   12/1985   Kataoka
4,859,337 A   8/1989    Woltermann
5,771,777 A * 6/1998    Davis ........................ 99/323
5,842,408 A   12/1998   Hatta

FOREIGN PATENT DOCUMENTS

| JP | 58-14902   | 3/1983  |
| JP | 60-7623    | 3/1985  |
| JP | 5-13324    | 4/1993  |
| JP | 6-113952   | 4/1994  |
| JP | 7-303567   | 11/1995 |
| JP | 8-33572    | 2/1996  |
| JP | 11-285443  | 10/1999 |

* cited by examiner

Primary Examiner—Terry K. Cecil
(74) Attorney, Agent, or Firm—Merchant & Gould P.C.

(57) ABSTRACT

An extraction bag with support includes a support member and a bag member which contains a material to be extracted or which is capable of containing a material to be extracted or which is capable of containing a material to be extraction, and is obtained by using a sheet composite on which the support member is arranged and joined along the center line of a water-permeable filtering sheet member, by folding the sheet composite into two and by passing it through a bag-making machine (and, as required, though a filling machine). The head portions of the extraction bag with support are torn apart, the right and left ends are pushed down or up toward the inside to push open the head portions. At the same time, the leg portions continuous with the head portions are folded down to place the extraction bag with support on an extraction container. An extracting solution (hot water) is poured into the material to be extracted that is filled through the portion cut and torn away from the head portions or onto the material to be extraction that has been contained therein, thereby to safely conduct the extraction.

21 Claims, 10 Drawing Sheets

EXTRACTION BAG WITH SUPPORT FOR CONTAINING A MATERIAL TO BE EXTRACTED AND SHEET COMPOSITE THEREFOR

TECHNICAL FIELD

The present invention relates to an extraction bag with support, an extraction bag with support containing a material to be extracted and to a sheet composite for producing the bags. More specifically, the invention relates to an extraction bag with support, an extraction bag with support containing a material to be extracted, with which the extraction bag or the extraction bag containing a material to be extracted is stably placed on an extraction container to safely conduct the extraction, and to a sheet composite for easily and efficiently producing the extraction bags with support.

BACKGROUND ART

Japanese Examined Utility Model Publication (Kokoku) No. 60-7623 and Japanese Unexamined Patent Publication (Kokai) No. 8-33572 disclose extraction utensils in which a bag made of a filter and a holder made of a thick paper are combined integrally together, and the holder is folded to assemble a support, thereby to extract a material in the bag.

Further, Japanese Unexamined Patent Publication (Kokai) No. 11-285443 discloses a simple utensil for extracting beverages such as coffee or the like by perforating a center hole at the center on the center line of a thick sheet, forming pushing lines on the outer sides of the center hole at the center enabling the central portion to be pushed up, forming a pair of support pieces on both outer sides of the center hole so as to meet the center line at right angles and so as to be folded down via the pushing lines, and adhering the top edge of the bag made of a filtering paper to the back side of the whole peripheral edge of the center hole.

So far, however, the extraction bags with support have been produced requiring three separate steps, i.e., producing, first, a bag, attaching and fixing the bag to a support, and filling the bag with a material to be extracted. It has therefore been strongly urged to produce a new extraction bag with support that can be produced by continuously conducting the above three steps in the form of a single step.

DISCLOSURE OF THE INVENTION

The present invention provides a bag with support for containing a material to be extracted or a bag with support containing the material to be extracted, which can be stably supported in or on an extraction container enabling the material in the extraction bag to be stably extracted, and which can be easily and highly efficiently produced through a simple step. The invention further provides a sheet composite for producing the bags.

An extraction bag (1) with support, of the present invention, comprises:
  a bag member made of a water-permeable filtering sheet for containing a material to be extracted; and
  a support member made of a water-resistant sheet for forming a support for said bag member; wherein
    said bag member has front and back face sections formed by folding said water-permeable filtering sheet into halves along a center line thereof, said front and back face sections continuing to each other at their top edges thereof, and being joined and sealed together at both side edge portions and at the bottom edge portion;
    said support member is folded into halves along the center line thereof, and has front and back face sections overlapped on the outer sides of the front and back face sections of said bag member, the front and back face sections of said support member continuing to each other at the top edge thereof, symmetrical to each other, the common top edge of said support member being overlapped on the common top edge of said bag member, and a maximum width of said bag member being larger than a maximum width of said support member;
    the front and back face sections of said support member are sectionalized into head and leg portions due to folding lines formed in the direction of width thereof, and said head and leg portions can be folded along said folding lines;
    arcuate push-bending lines are formed at the right and left edges of the continuing head portions of the front and back face sections of said support member passing through said top edges and reaching the right and left ends of said folding lines, and right and left push-bending portions are formed on the outer sides of the right and left push-bending lines;
    arcuate rows of perforations for cutting or tearing are formed in the continuing head portions of the front and back face sections of said support member on the inside of said right and left push-bending lines over the front and back face sections of said support member and over the front and back face sections of said bag member held therebetween, so as to be separated away from said right and left push-bending lines, portions for cutting or tearing are formed on the inside of said rows of perforations for cutting or tearing, or the portions for cutting or tearing of the front and back face sections of said support member are cut and torn away, and said arcuate perforations for cutting or tearing are formed in the front and back face sections of said bag member only;
    the front and back face sections of said support member and the front and back face sections of said bag member in contact thereto are joined together on at least one region of the leg portions; and
    the portions for cutting and tearing of said bag member and of said support member, or only the portion for cutting and tearing of said bag member when the portions for cutting and tearing of said support member have been cut and torn away, are cut and torn apart along said rows of perforations for cutting or tearing, the right and left push-bending portions in the upper portion of said support member are pushed up or pushed down inwardly along said push-bending lines, so that the two continuing head portions of the front and back face sections of said support member are push-opened toward both sides of said common top edge, that said portions for cutting or tearing of the bag member are opened and that the leg portions of the front and back face sections of said support member are folded down from the push-opened head portions along said transverse folding lines, whereby the leg portions of the support member supporting the opened bag member are allowed to be placed on the extraction container and the material to be extracted is contained in said bag member.

In the bag (1) with support, of the present invention, it is desired that downwardly extending middle aprons are formed at the central portions at the lower ends of the leg portions of said front and back face sections of said support member.

In the bag (1) with support, of the present invention, it is desired that downwardly extending right and left side lower projections are formed at both the right and left lower ends of the leg portions of said front and back face sections of said support member.

In the bag (1) with support of the present invention, it is desired that downwardly extending middle aprons are formed at the central portions at the lower ends of the leg portions of said front and back face sections of said support member, downwardly extending right and left side lower projections are formed at both the right and left ends of said leg portions, and said right and left side lower projections form dents with respect to said middle aprons.

In the bag (1) with support, of the present invention, one or more dents may be formed in the central portions of the middle aprons of the front and back face sections of said support member.

In the bag (1) with support, of the present invention, the front and back face sections of said bag member may have a square or rectangular shape.

In the bag (1) with support, of the present invention, the bottom edge of said bag member may be formed straight, and the width of the bottom edge may be smaller than the width of the common top edge of said bag member.

In the bag (1) with support, of the present invention, two projections may be formed on the bottom edge of said bag member, and the distance between the ends of the two projections may be smaller than the width of the common top edge of said bag member.

An extraction bag (2) with support containing a material to be extracted, of the present invention, comprises:
  a bag member made of a water-permeable filtering sheet for containing a material to be extracted; and
  a support member made of a water-resistant sheet for forming a support for said bag member; wherein
    said bag member has front and back face sections formed by folding said water-permeable filtering sheet into halves along a center line thereof, said front and back face sections continuing to each other at their top edges thereof, and being joined and sealed together at their both side edge portions and bottom edge portion;
    said support member is folded into halves along the center line thereof, and has front and back face sections overlapped on the outer sides of the front and back face sections of said bag member, the front and back face sections of said support member continuing to each other at the top edge thereof, symmetrical to each other, the common top end of said support member being overlapped on the common top edge of said bag member, and a maximum width of said bag member being larger than a maximum width of said support member;
    the front and back face sections of said support member are sectionalized into head and leg portions due to folding lines formed in the direction of width thereof, and said head and leg portions can be folded along said folding lines;
    arcuate push-bending lines are formed at the right and left edges of the continuing head portions of the front and back face sections of said support member passing through said top edges and reaching the right and left ends of said folding lines, and right and left push-bending portions are formed on the outer sides of the right and left push-bending lines;
    arcuate rows of perforations for cutting or tearing are formed in the continuing head portions of the front and back face sections of said support member on the inside of said right and left push-bending lines over the front and back face sections of said support member and over the front and back face sections of said bag member held therebetween, so as to be separated away from said right and left push-bending lines, portions for cutting or tearing are formed on the inside of said rows of perforations for cutting or tearing, or the portions for cutting or tearing of the front and back face sections of said support member are cut and torn away, and said arcuate perforations for cutting or tearing are formed in the front and back face sections of said bag member only;
    the front and back face sections of said support member and the front and back face sections of said bag member in contact therewith are joined together in at least one region of the leg portions; and
    the portions for cutting and tearing of said bag member containing said material to be extracted and of said support member are cut and torn apart along said rows of perforations for cutting or tearing, or the portion for cutting and tearing of said bag member only is cut and torn apart along said row of perforations for cutting or tearing when the portions for cutting and tearing of said support member have been cut and torn away, the right and left push-bending portions at upper portions of said support member are pushed up or pushed down inwardly along said push-bending lines, so that the two continuing head portions of the front and back face sections of said support member are push-opened toward both sides of said common top edge, that said portions for cutting or tearing of the bag member are opened and that the leg portions of the front and back face sections of said support member are folded down from the push-opened head portions along said transverse folding lines, whereby the leg portions of the support member supporting the opened bag member are allowed to be placed on the extraction container.

In the bag (1) with support containing a material to be extracted, of the present invention, it is desired that downwardly extending middle aprons are formed at the central portions at the lower ends of the leg portions of said front and back face sections of said support member.

In the bag (1) with support containing a material to be extracted, of the present invention, it is desired that downwardly extending right and left side lower projections are formed at both the right and left lower ends of the leg portions of said front and back face sections of said support member.

In the bag (1) with support containing a material to be extracted, of the present invention, it is desired that downwardly extending middle aprons are formed at the central portions at the lower ends of the leg portions of said front and back face sections of said support member, downwardly extending right and left side lower projections are formed at both the right and left ends of said leg portions, and said right and left side lower projections form dents with respect to said middle aprons.

In the bag (1) with support containing a material to be extracted, of the present invention, one or more dents may be formed in the central portions of the middle aprons of the front and back face sections of said support member.

In the bag (1) with support containing a material to be extracted, of the present invention, the front and back face sections of said bag member may have a square or rectangular shape.

In the bag (1) with support containing a material to be extracted, of the present invention, the bottom edge of said bag member may be formed straight, and the width of the bottom edge may be smaller than the width of the common top edge of said bag member.

In the bag (1) with support containing a material to be extracted, of the present invention, two projections may be formed on the bottom edge of said bag member, and the distance between the ends of the two projections may be smaller than the width of the common top edge of said bag member.

A sheet composite (3) for producing an extraction bag with support of the present invention comprises:

a water-permeable filtering sheet member; and a plurality of support members arranged on the sheet member in the lengthwise direction thereof maintaining a distance; wherein said support member are each constituted by two symmetrical half portions on both sides of a center line thereof, the support members being arranged on said sheet member in such a manner that the center lines thereof are in agreement with the center line of said sheet member in the lengthwise direction thereof;

the two half portions of said support members are continuing to each other along the center lines;

wherein when the center lines are oriented in the horizontal direction and when the half portions are viewed in such a manner that said center lines form top edges of the half portions:

(1) each half portion includes a head portion close to the top edge (center line), a folding line formed in parallel with the top edge, and a leg portion continuous to said top portion via the folding line;

(2) arcuate push-bending lines are formed at the right and left ends of the head portion of each half portion extending inward from the right and left ends of said folding line, the arcuate push-bending lines continuing to each other at said top edge;

(3) arcuate rows of perforations are formed in said head portion of each half portion on the inside of the right and left arcuate push-bending lines penetrating through said support member and through said sheet member so as to be separated away from said push-bending lines, the rows of perforations in each half portion continue into each other at the top edge so as to form an arcuate row of perforations for cutting or tearing, a portion for cutting and tearing is formed on the inside of the arcuate rows of perforation for cutting or tearing, or the portion for cutting or tearing of said support member is cut and torn away, and said row of perforations is formed in the sheet member only; and (4) each half portion of the support member and said sheet member are joined to each other in at least one region of said leg portion.

In a sheet composite (3) for producing an extraction bag with support, of the present invention, it is desired that outwardly extending middle aprons are formed at the central portions at the outer ends of the leg portions of the two half portions of said support member.

In a sheet composite (3) for producing an extraction bag with support of the present invention, it is desired that outwardly extending right and left side lower projections are formed at both the right and left outer ends of said leg portions of the two half portions of said support member.

In a sheet composite (3) for producing an extraction bag with support of the present invention, it is desired that downwardly extending middle aprons are formed at the central portions at the lower ends of the leg portions of said front and back face sections of said support member, downwardly extending right and left side lower projections are formed at both the right and left ends of said leg portions, and said right and left side lower projections form dents with respect to said middle aprons.

In a sheet composite (3) for producing an extraction bag with support of the present invention, one or more dents may be formed in the central portions of the middle aprons at the front and back face sections of said support member.

BEST MODE FOR CARRYING OUT THE INVENTION

The constitution of a support member forming a support of an extraction bag with support of the present invention will now be described.

Figure 1:
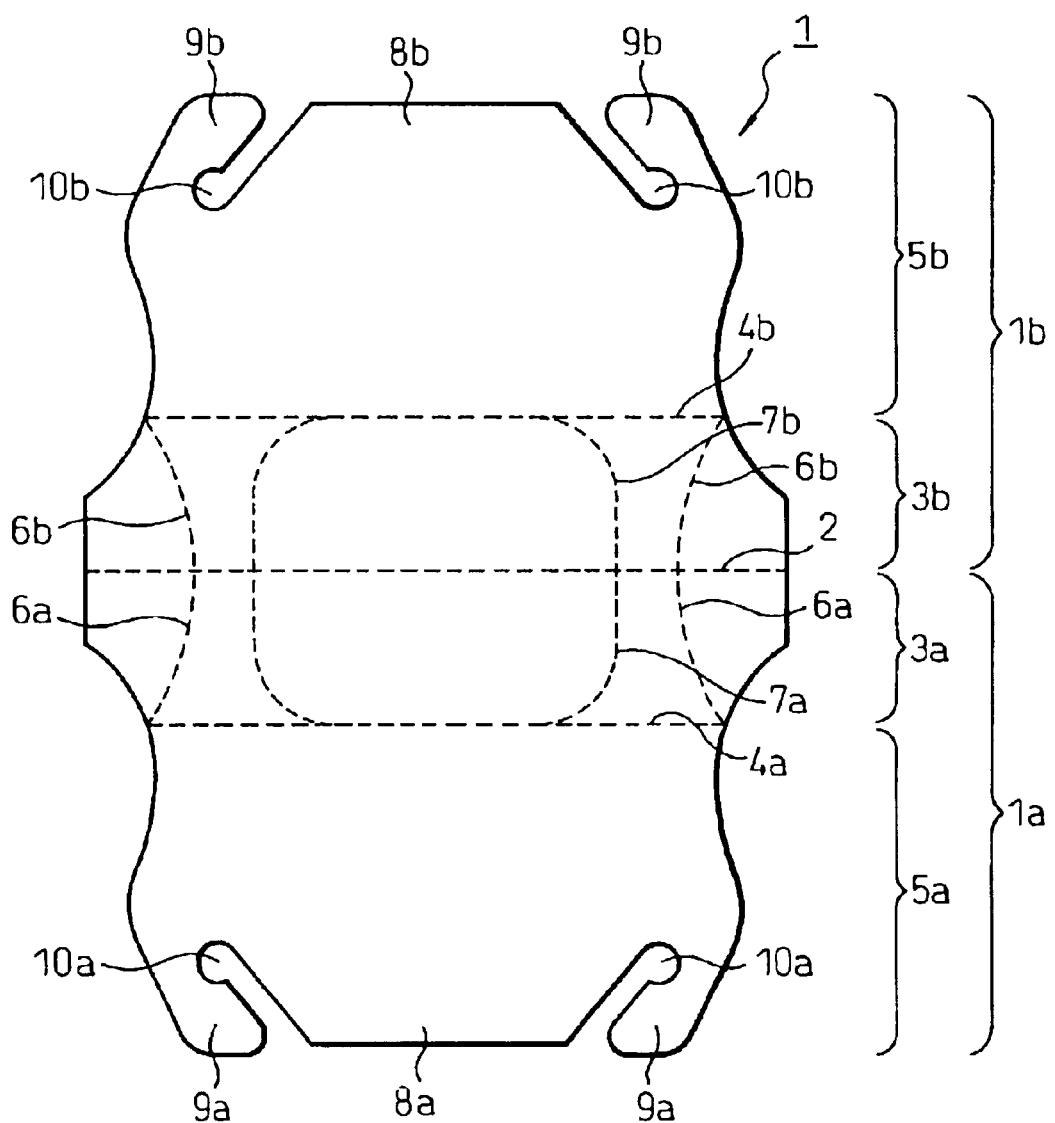
FIG. 1 is a front view showing a shape of a support member used for an extraction bag with support of the present invention.

FIG. 1 illustrates a front shape of a support member, wherein the support member 1 is constituted by two half portions 1a and 1b which are symmetrical on both sides of a center line 2 (on both the upper and lower sides in FIG. 1). The two half portions 1a and 1b are continuing to each other along the center line 2.

When the center line is oriented in the horizontal direction and when the half portions 1a and 1b are viewed in such a manner that said center line 2 form top edges of the half portions:

(1) the half portions 1a and 1b include head portions 3a and 3b close to the top edge (i.e., center line 2), folding lines 4a and 4b formed in parallel with the top edge (center line) 2, and leg portions 5a and 5b continuous to the head portions 3a and 3b via the folding lines 4a and 4b;

(2) arcuate push-bending lines 6a and 6b are formed at the right and left ends of the head portions 3a and 3b of the half portions 1a and 1b extending inward from the right and left ends of the folding lines 4a and 4b, the arcuate push-bending lines 6a and 6b of the half portions being continuous with each other at the top edge (center line) 2;

(3) arcuate rows of perforations 7a and 7b are formed in the head portions 3a and 3b of the half portions 1a and 1b on the inside of the right and left arcuate push-bending lines 6a and 6b, and are continuous with each other at the top edge (center line) 2 to form a closed shape.

Portions of the rows of perforations 7a and 7b away from the center line 2 may be overlapped on the folding lines 4a and 4b or may be formed on the inside of the folding lines 4a and 4b.

The support member 1 may be folded along the center line 2 so as to form two symmetrical half portions 1a and 1b, which can, then, be overlapped one upon the other.

Outwardly extending middle aprons 8a and 8b may be formed at the central portions at the outer ends of the leg portions 5a and 5b of the two half portions 1a and 1b.

Pairs of outwardly extending right and left side lower projections 9a and 9b may further be formed at both the right and left ends of the leg portions 5a and 5b of the two half portions 1a and 1b of the support member 1. Dents 10a and 10b may be formed between the middle aprons 8a, 8b and the right and left side lower projections 9a, 9b. The action of these aprons and dents will be described later.

A sheet composite for producing the extraction bag with support of the present invention will now be described with reference to FIG. 2.

Figure 2:
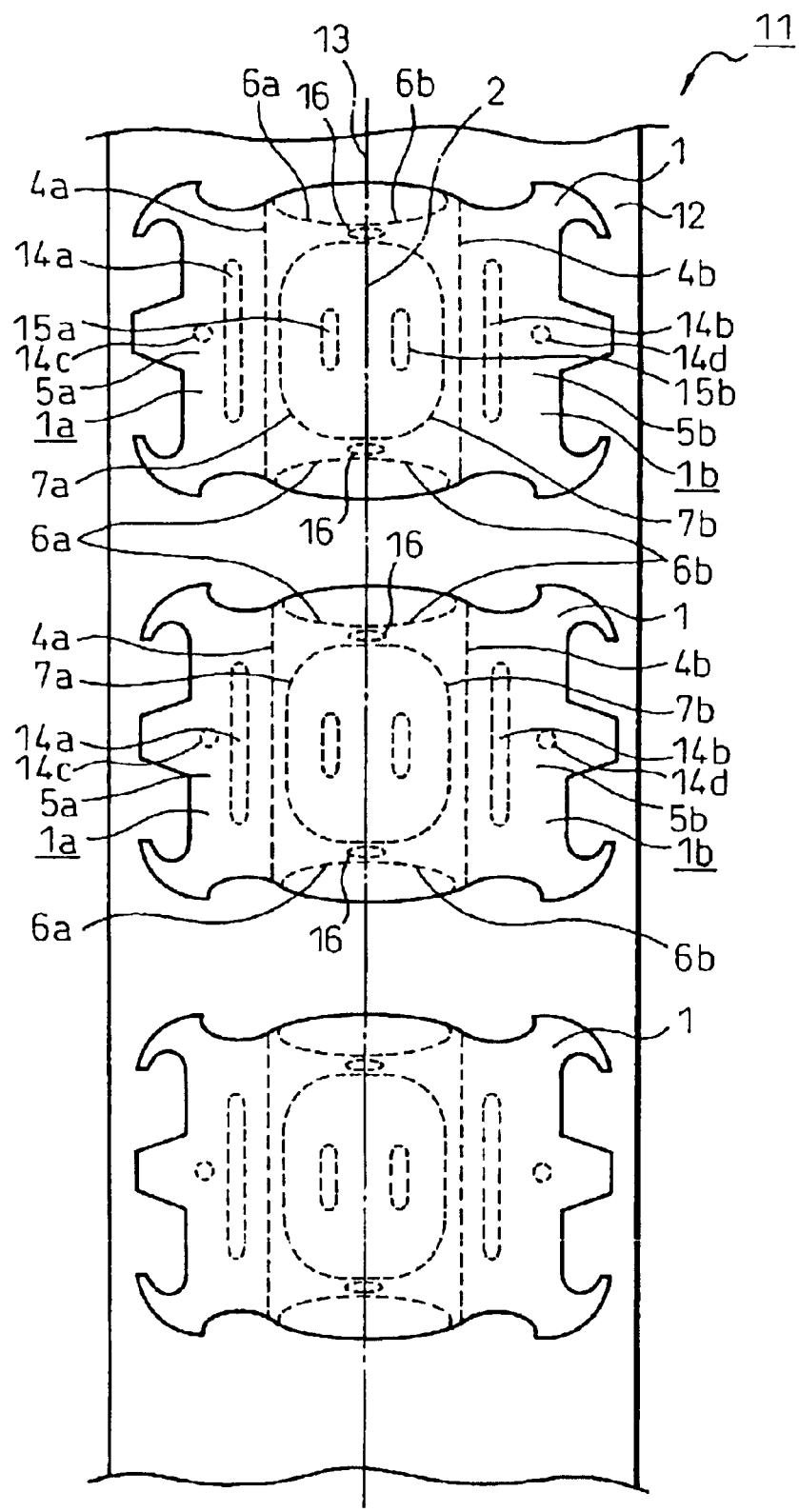
FIG. 2 is a front view illustrating the constitution of a sheet composite for producing the extraction bag with support of the present invention.

In FIG. 2, the sheet composite 11 includes a water-permeable filtering sheet member 12 and a plurality of support members 1 arranged on the sheet member 12 in the lengthwise direction thereof maintaining a distance. The support members 1 are so arranged that the center lines 2 thereof are in agreement with the center line 13 of the sheet member 12.

Leg portions 5a and 5b of the half portions 1a and 1b of the support member 1 are adhered to the sheet member 12 on partial regions 14a and 14b.

As required, further, the sheet member 12 and the support member 1 may be adhered together on the half portions 1a and 1b of the support member 1, on the regions 14a and 14b on the outer sides of the folding lines 4a and 4b but close thereto or, as required, on portions 15a and 15b of the regions inside the rows of perforations 7a and 7b or, as required, on the regions 16 spanning on both sides of the center line (top edge) 2 of the support member 1 between the push-binding lines 6a, 6b and the rows of perforations 7a, 7b, or may further be adhered on small regions 14c and 14d on the outer side of the adhesive regions 14a and 14b. Rows of perforations (not shown) are formed in the sheet member 12 at positions corresponding to the rows of perforations 7a and 7b of the support member 1, so as to be cut and torn apart.

Or, the portions for cutting and tearing of the support member may have been cut and torn away in advance. In this case, the row of perforations (not shown) is formed in the sheet member only.

When folded into halves along the center line 13 which is in the lengthwise direction with the support member 1 on the outer sides, the sheet composite having the above-mentioned constitution assumes a symmetrical shape on both surfaces thereof with respect to the center line.

A step of producing the extraction bag with support of the present invention from the sheet composite of the present invention will now be described with reference to FIG. 3.

Figure 3:
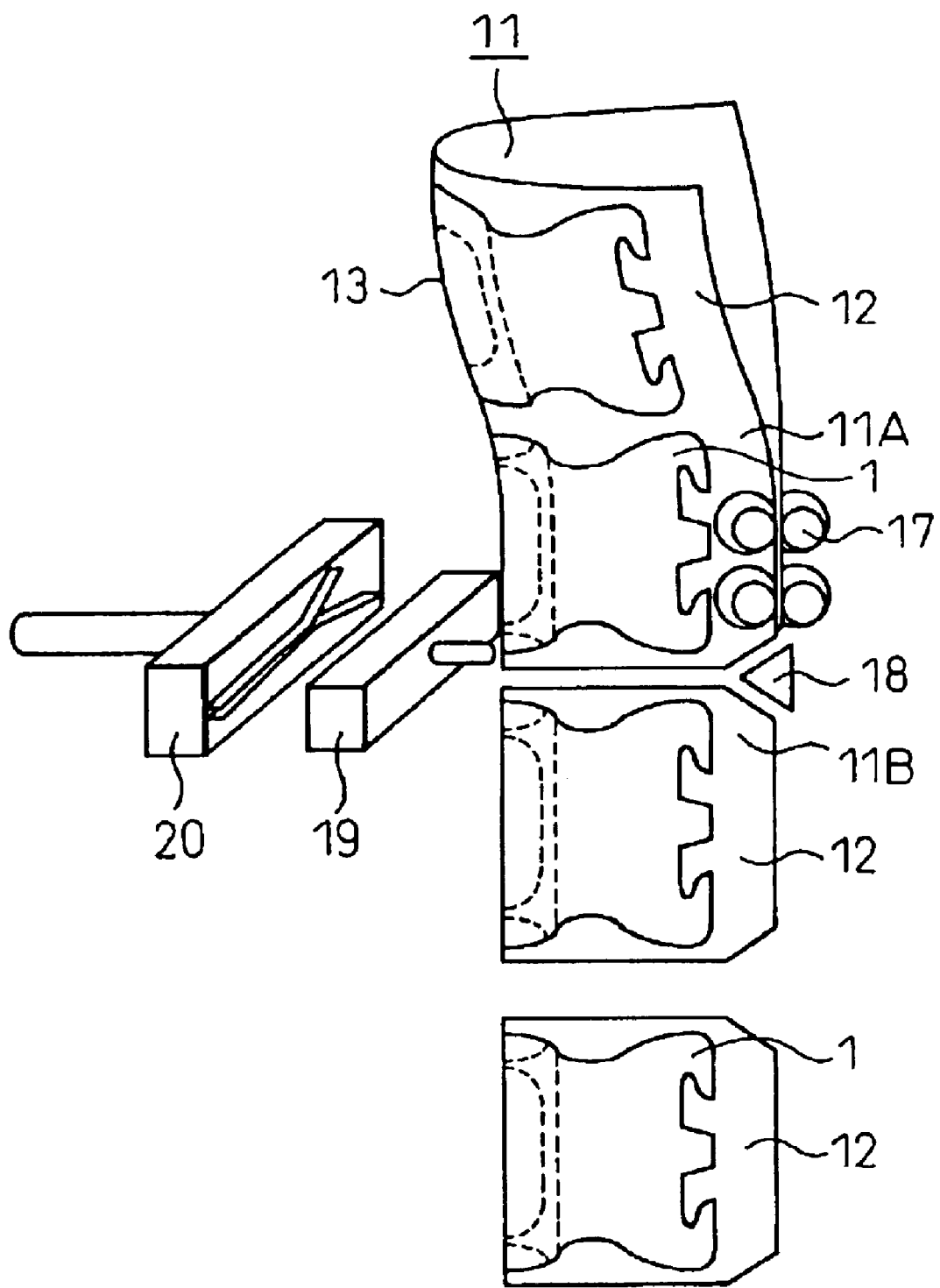
FIG. 3 is a view illustrating how to produce the extraction bag with support of the present invention from the sheet composite of the present invention.

In FIG. 3, the sheet composite 11 is folded into halves along the center line in the lengthwise direction thereof, and the overlapped side edge portions are fed to a bag-making machine (not shown) while being joined together using an adhering machine 17. When a portion 11A including one support member 1 of the sheet composite 11 folded into halves, has arrived at a position where the bag-making machine produces a bag and where the material to be extracted is filled therein, a gap portion of the overlapped sheet member is adhered like a belt at a portion (gap portion) between the sheet composite portion 11A and the sheet composite portion 11B neighboring thereto on the downstream side, and the belt-like adhered portion is cut. Here, a portion close to the edge of the sheet member of the belt-like adhered portion is adhered in a Y-shape and is cut in the Y-shape by using an adhering/cutting machine 18. A triangular portion 19 between the branching two sides may be removed (by, for example, suction) as scrap. When the sheet member contains a synthetic fiber that can be melt-adhered, the adhering/cutting machine 18 may have, as shown in FIG. 3, an ultrasonic horn (heating member) 20 and an anvil 21 with a Y-shaped adhering/cutting surface facing thereto.

The ultrasonic sealing machine shown in FIG. 3 can be used as the adhering machine 17 for adhering the overlapped side edge portions of the sheet member 12. Upon adhering and cutting the gap portion of the sheet member, further, the upper end of the downstream portion 11B neighboring the sheet composite portion 11A is, at the same time, adhered and sealed, and is separated as a complete extraction bag with support from the sheet composite portion 11A.

The material to be extracted can then be filled in the sheet composite portion 11A of which the lower edge portion and the side edge portions of the sheet member are adhered. In this case, the bag portion 11A obtained as described above, containing the material to be extracted and having its upper end open, is moved to a downstream position from the position where it is adhered and filled, and has its upper opening portion joined and sealed in the same manner as described above, and is cut and separated away from the upstream sheet composite material neighboring thereto. Thus, there is obtained the extraction bag (2) with support containing the material to be extracted. In the case of the extraction bag (1) with support without containing the material to be extracted, the material to be extracted can be filled after the extraction bag (1) is opened.

Figure 4:
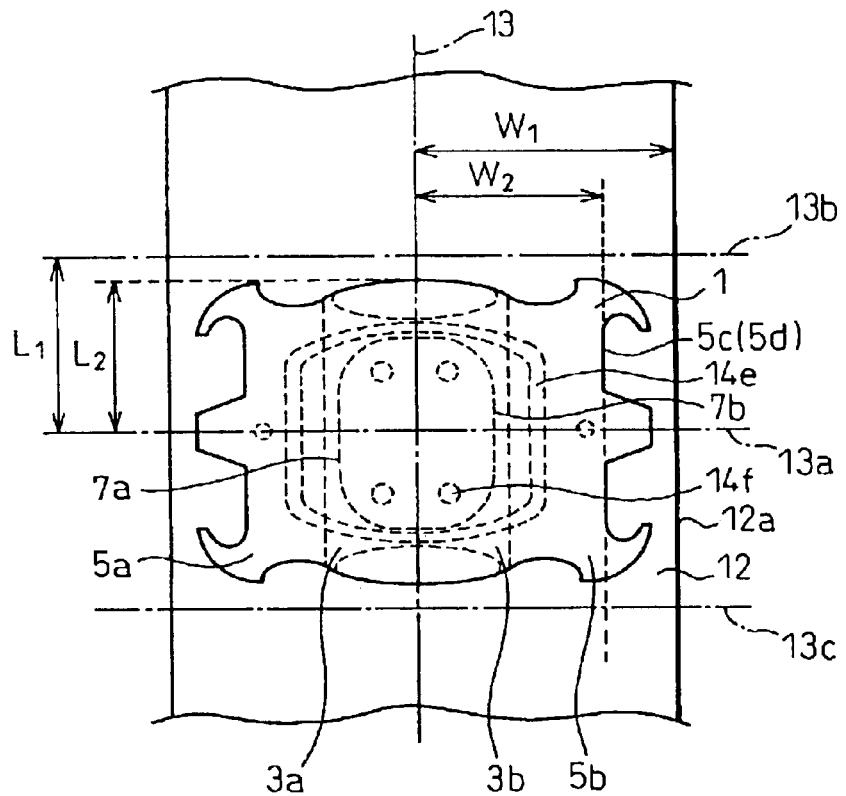
FIG. 4 is a front view illustrating another shape of the sheet composite of the present invention.

In the sheet composite of the present invention as shown in FIG. 4, the support member 1 and the sheet member 12 may be adhered together on a junction region 14e. The junction region 14e is continuously formed over the head portions 3a, 3b and the leg portions 5a, 5b of the support member 1 on the outer side of the rows of perforations 7a and 7b. The junction region may be formed in the form of double annular lines in parallel with each other, or may be formed as one or more annular lines with many discrete spots on the annular lines.

Further, the sheet member 12 and the support member 1 may be adhered together on one junction region on a region (portion for cutting or tearing) on the inside of the rows of perforations 7a and 7b, or may, as shown in FIG. 4, be adhered together on two or more regions, for example, on a total of four regions, i.e., two regions on the right and two regions on the left of the center line 13.

Figure 5:
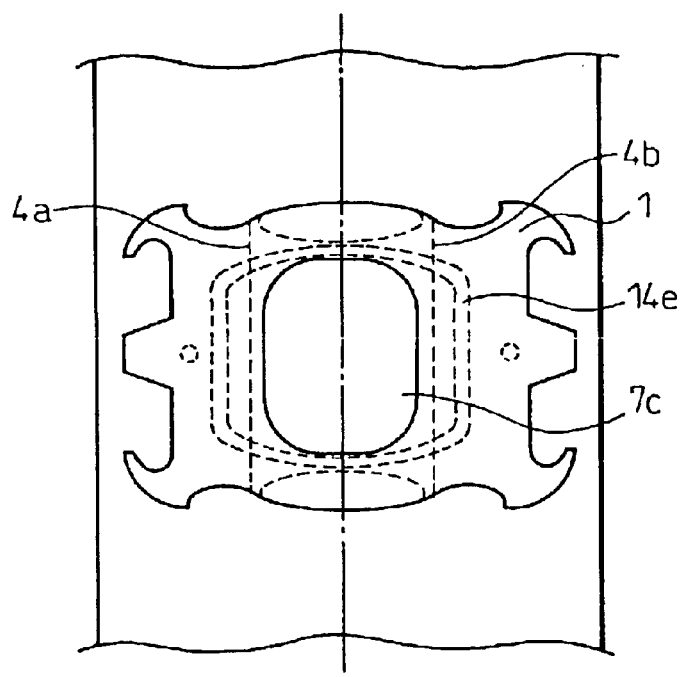
FIG. 5 is a front view illustrating a further shape of the sheet composite of the present invention.

Further, the regions for tearing inside the row of perforations 7a and 7b of the support member 1 shown in FIG. 4 may have been torn away in advance forming a cavity portion 7c as shown in FIG. 5.

In FIG. 4, it is desired that the sheet member 12 and the support member 1 possess the following dimensional relationship.

The ratio ($W_2/W_1$) of the distance (direction of width) $W_2$ from the vertical center line 13 of the sheet member 12 to the bottom portion 5c (5d) of the leg portion 5a (5b) of the support member 1 and the distance (direction of width) $W_1$ from the vertical center line 13 of the sheet member 12 to the side line 12a, is, desirably, from 1:0.8 to 1:3.0 and, more desirably, from 1:1.1 to 1:1.5. When the ratio $W_2/W_1$ is 1:1 or larger, i.e., when $W_2$ is more than 1 time as large as $W_1$, it is desired that the bottom of the obtained bag member is cut inward and that the bottom is broadened. It is further desired that the ratio ($L_2/L_1$) of the distance (lengthwise direction) $L_2$ from the transverse center line 13a of the support member 1 to the most protruded portion of the support member 1 in the lengthwise direction and the distance (lengthwise direction) $L_1$ from the transverse center line 13a to a transverse cutting line 13b at an intermediate point to the neighboring support member, is from 1:1 to 1:2.0.

Extraction bags (1) and (2) with support of the present invention produced by the above-mentioned method will now be described.

Figure 6:
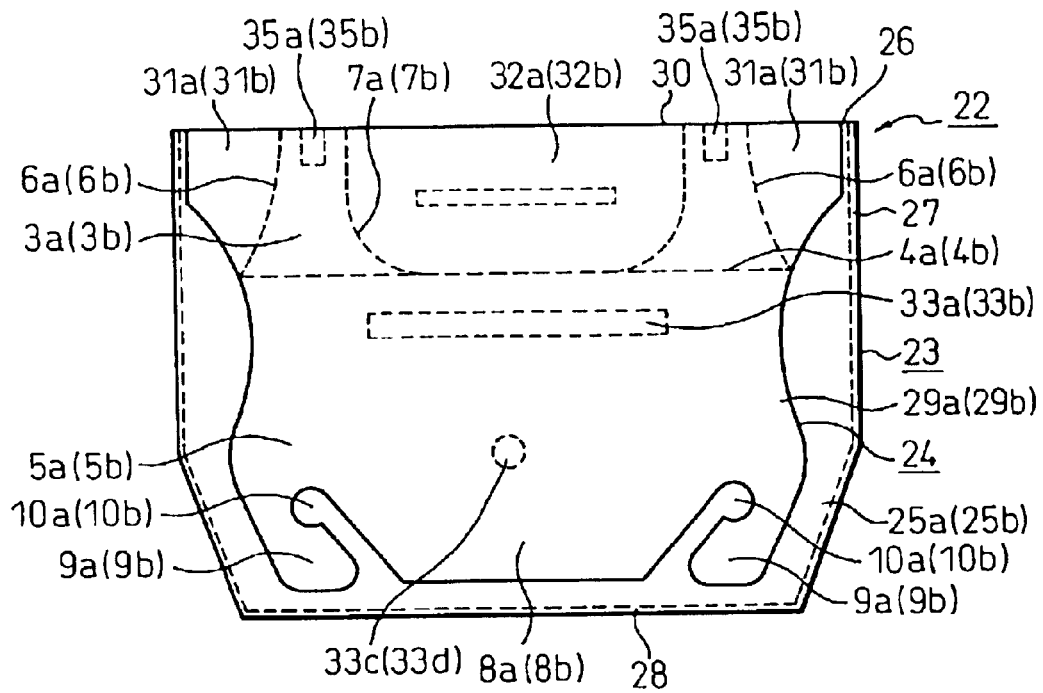
FIG. 6 is a front view illustrating a constitution of the extraction bag with support of the present invention.

In FIG. 6, the extraction bag 22 with support is formed of a water-permeable filtering sheet, and includes a bag member 23 containing a material (not shown) to be extracted and a support member 24 which is formed of a water-resistant sheet material and forms a support for the bag member 23.

The bag member 23 has front and back face sections 25a and 25b formed by folding the water-permeable filtering sheet into halves along the center line thereof. The front and back face sections 25a and 25b are not adhered but are continuous with each other at the top edge 26 (i.e., along the center line), but are joined and sealed together at its both side edge portions 27 and at its bottom edge portion 28.

The support member 24 has front and back face sections 29a and 29b formed by being folded into halves along the center line. The front and back face sections 29a and 29b of the support member are overlapped on the outer sides of the front and back face sections 25a and 25b of the bag member. The front and back face sections 29a and 29b of the support member are continuing (without being adhered) to each other at the top edge (i.e., along the center line) 30, and are symmetrical to each other. The common top edge 30 of the support member is overlapped on the common top edge 27 of the bag member.

A maximum width of the bag member 25 is greater than a maximum width of the support member 24. Therefore, the extraction bag with support of the present invention is easily and efficiently produced through a series of steps by using a sheet composite obtained by arranging and adhering a plurality of support members on the sheet and member maintaining a predetermined distance in advance as shown in FIG. 2.

The front and back face sections 29a and 29b of the support member are sectionalized into head portions 3a, 3b and leg portions 5a, 5b by the folding lines 4a, 4b formed in the direction of width. The head and leg portions can be folded along the folding lines 4a and 4b.

The head portions 3a and 3b in the front and back face sections 29a ad 29b of the support member continuous with each other through the top edge 30 thereof. In the head portions 3a and 3b are formed arcuate push-bending lines 6a and 6b that reach the right and left ends of the folding lines 4a and 4b from the top edge 30. The right and left push-bending portions 31a and 31b are formed on the outer sides of the right and left push-bending lines 6a and 6b.

In the head portions 3a and 3b of the front and back face sections of the support member 24 continuous with each other along the top edge 30, rows of perforations 7a and 7b for cutting and tearing are formed on the inside of the right and left push-bending lines 6a and 6b over both the front and back face sections of the bag member sandwiched between the front and back face sections of the support member. Further, the arcuate rows of perforations are formed on the inside of the right and left push-bending lines being separated away therefrom. The arcuate rows of perforations 7a and 7b of the support member and of the bag member continue along their top edges 27 and 30, and form portions for cutting and tearing on the inside thereof.

The front and back face sections 29a and 29b of the support member, and the front and back face sections 25a and 25b of the bag member in contact therewith, are joined to each other on partial regions 33a and 33b of the leg portions of the front and back face sections 29a and 29b of the support member and, as required, further on partial regions 33c and 33d formed under the regions 33a and 33b.

As required, further, the front and back face sections 25a and 25b of the bag member, and the front and back face sections 29a and 29b of the support member may be adhered on partial regions 34a and 34b of the portions 32a and 32b for cutting and tearing. As required, further, they may be joined on the regions 35a and 35b over both sides of the top edge 30 of the support member between the rows of perforations 7a (7b) for cutting and tearing and the push-bending lines 6a (6b).

It is further desired that the downwardly extending middle aprons 8a and 8b are formed at the lower central portions of the leg portions 5a and 5b of the front and back face sections 29a and 29b of the support member 1. It is further desired that the downwardly extending right and left side lower projections 9a and 9b are formed at the right and left end portions at the lower ends of the leg portions 5a and 5b. In this case, the dents 10a and 10b may be formed between the middle aprons 8a, 8b and the right and left side lower projections 9a, 9b. Or, the middle aprons 8a, 8b and the right and left side lower projections 9a, 9b may be sectionalized by forming simple cutting lines.

Figure 7:
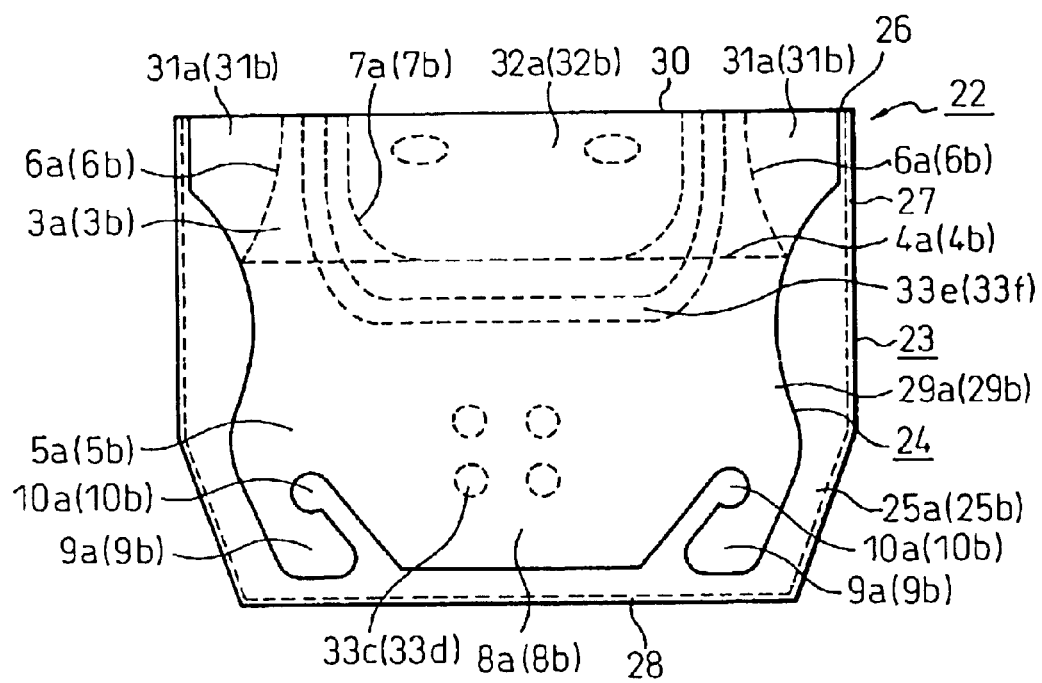
FIG. 7 is a front view illustrating another constitution of the extraction bag with support of the present invention.

In an extraction bag 22 with support shown in FIG. 7, the support member 24 and the bag member 23 are adhered together on the junction regions 33e (33f) provided on the outer side of the rows of perforations 7a (7b). The junction regions 33e (33f) continue from the head portions 3a (3b) over to the leg portions 5a (5b) of the support member 24. The junction regions 33e (33f) may be formed along an annular line or may be formed along two annular lines which are in parallel with each other. The junction regions may consist of many discrete junction spots that are arranged along one or two or more annular lines.

Referring to FIG. 7, the leg portions 5*a* (5*b*) of the support member 1 and the front and back face sections of the bag member 12 may be adhered together on two or more (e.g., three to four) junction regions 33*c* (33*d*).

The shape of the leg portions of the support member is not limited to those shown in FIGS. 6 and 7, but may have other shapes such as those shown in FIGS. 8, 9, 10 and 11.

Figure 8:
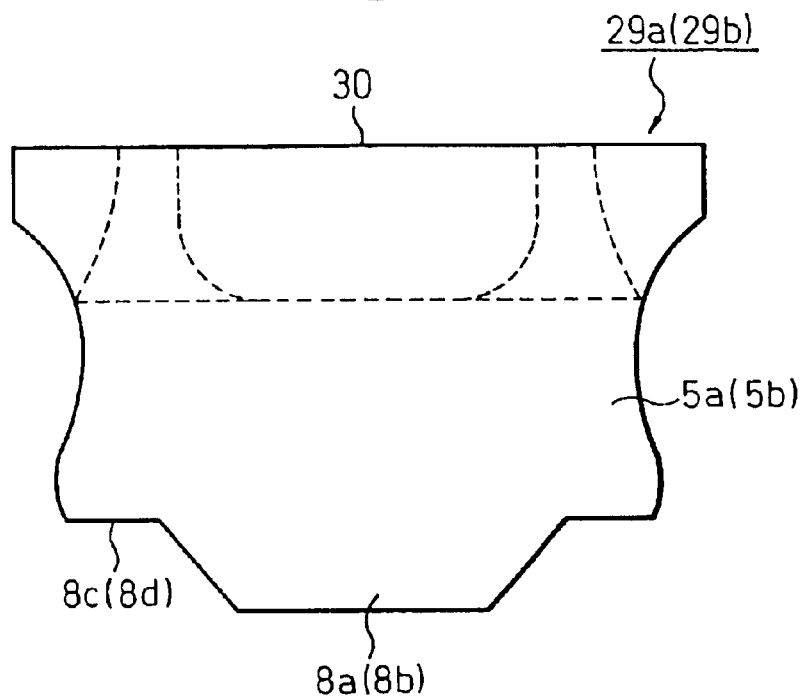
FIG. 8 is a front view illustrating a shape of the support member used for the extraction bag with support of the present invention.

In FIG. 8, the middle aprons 8*a* and 8*b* only are formed at the lower ends of leg portions 5*a* and 5*b* of the front and back face sections of the support member. There is no limitation on the shape and size thereof. To place the support member on the extraction container, the bottom portions 8*c* and 8*d* at the lower ends on the right and left of the middle aprons are placed on the upper edge of the extraction container, and the middle aprons 8*a* and 8*b* are inserted in the inner side at the top edge of the extraction container. Namely, the pair of middle aprons 8*a* and 8*b* are repelled outward due to the resiliency thereof, whereby the support is stably placed on the extraction container. Besides, the support member is prevented from sliding on the top edge of the extraction container.

Figure 9:
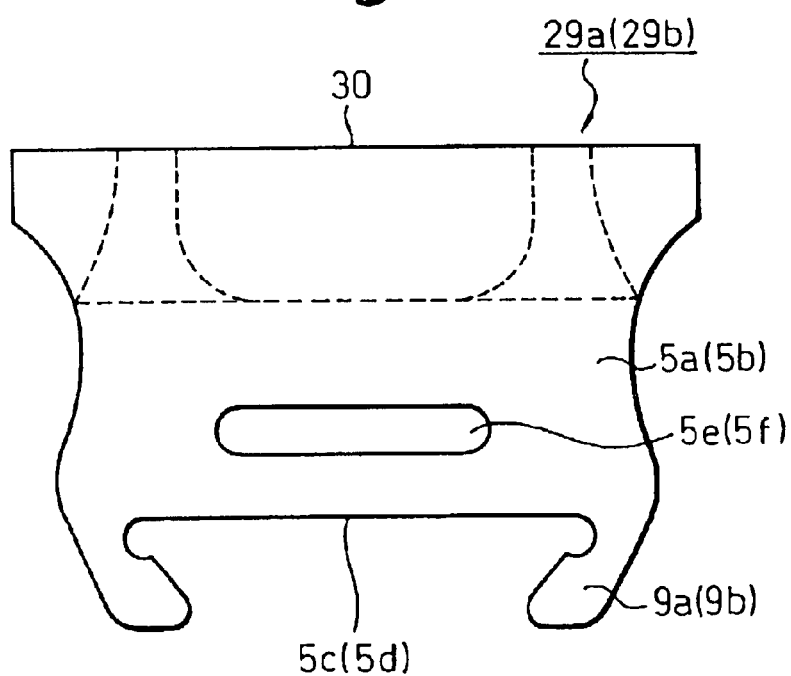
FIG. 9 is a front view illustrating another shape of the support member used for the extraction bag with support of the present invention.

In FIG. 9, the right and left side lower projections 9*a* and 9*b* are extending at the right and left lower ends of the leg portions 5*a* and 5*b* of the front and back face sections of the support member. There is no particular limitation on the shape thereof. To place the support member on the top edge of the extraction container, the central bottom portions 5*c* and 5*d* of the leg portions 5*a* and 5*b* of the front and back face sections 5*a* and 5*b* of the support member are placed on the top edge, and the right and left side lower projections 9*a* and 9*b* are permitted to extend to the outer side or the inner side of the top edge. In either case, the support member is stably held on the extraction container due to the repulsing force of the right and left side lower projections, and the support member is prevented from sliding on the top edge of the extraction container.

In FIG. 9, as required, cut-away portions 5*e* (5*f*) may be formed at the central portions of the leg portions 5*a* (5*b*) of the front and back face sections of the support member, so that the state of the bag member containing the material to be extracted can be observed during the extraction operation.

Figure 10:
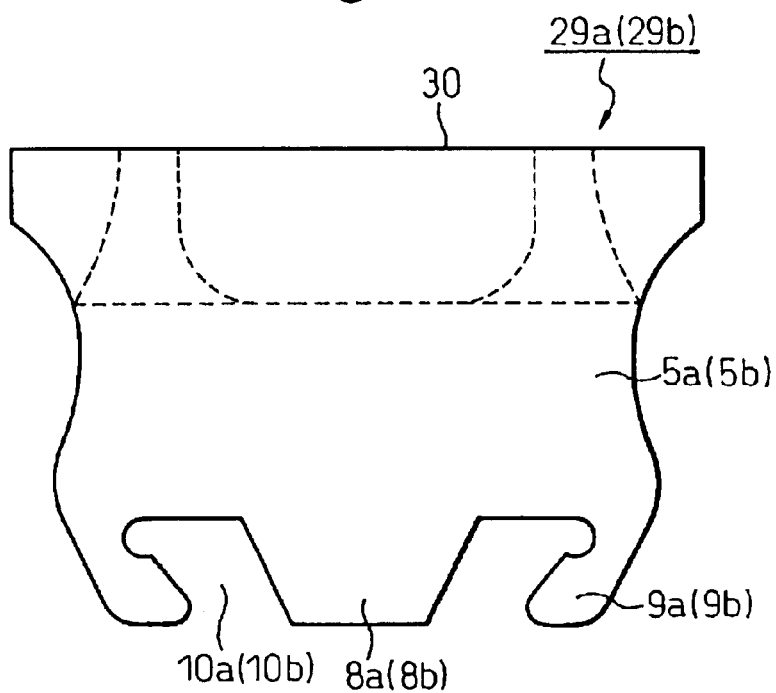
FIG. 10 is a front view illustrating a further shape of the support member used for the extraction bag with support of the present invention.

In FIG. 10, the width of the middle aprons 8*a* and 8*b* is shorter than that of the case of FIG. 4, permitting an increase in the width of the dents 10*a* and 10*b* formed relative to the right and left side lower projections 9*a* and 9*b* protruding toward the right and left. This enables the obtained extraction bag with support to be easily adapted even to an extraction container having a small diameter.

Figure 11:
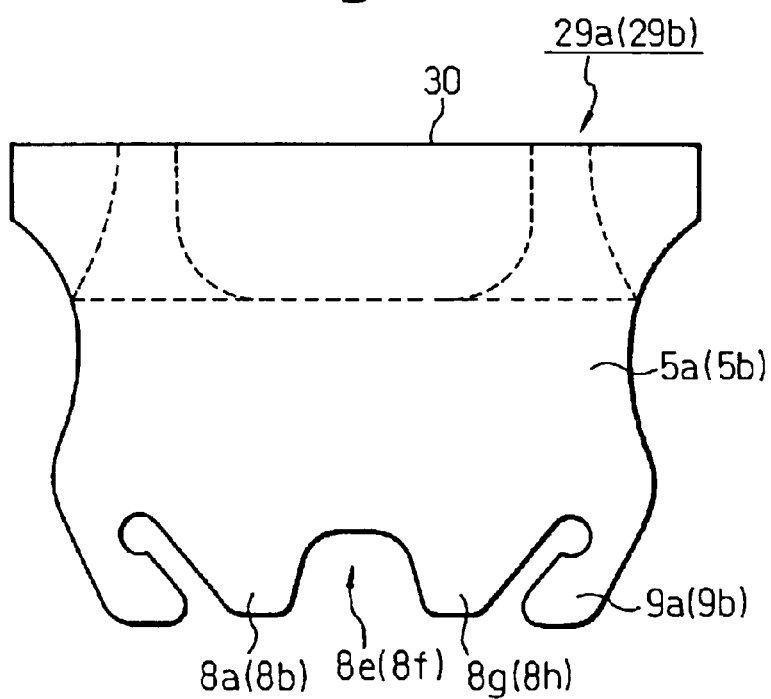
FIG. 11 is a front view illustrating a still further shape of the support member used for the extraction bag with support of the present invention.

In FIG. 11, central dents 8*e* and 8*f* are formed in the central portion of the middle aprons 8*a* and 8*b* formed at the lower ends of the leg portions of the front and back face sections of the support member. Therefore, the middle aprons are divided into two right and left hanging portions 8*g* and 8*h* due to the central dents 8*e* and 8*f*. This enhances the adaptability of the support member to extraction containers having complex shapes.

FIGS. 12 to 15 are front views illustrating bag members 23 used for the extraction bag with support of the present invention. In FIGS. 12 to 15, the front and back face sections of the bag member 23 continue into each other (not being adhered) at the top edge 26, but are adhered and sealed at both side edge portions 27 and at the bottom edge portion 28.

Figure 12:
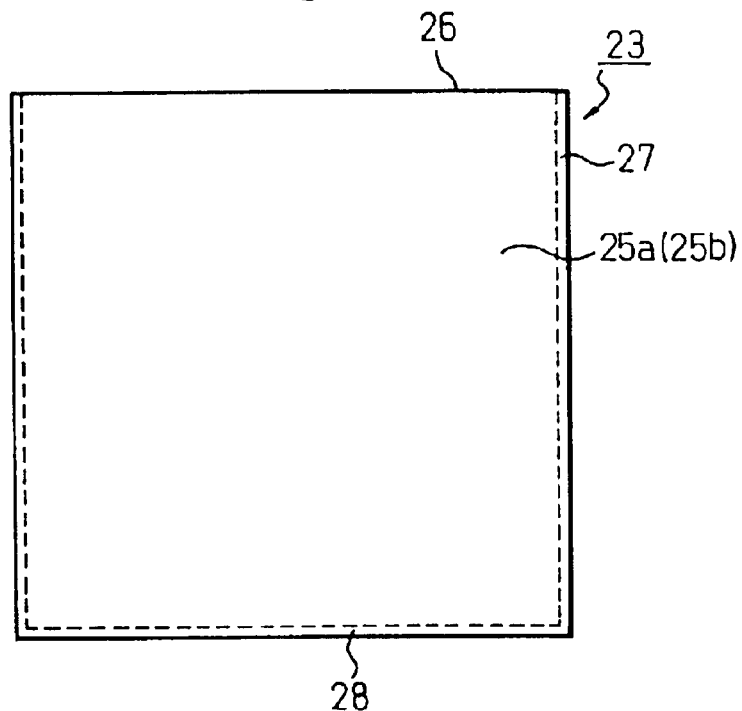
FIG. 12 is a front view illustrating a shape of a bag member of the extraction bag with support of the present invention.

In FIG. 12, the front and back face sections 25*a* and 5*b* of the bag member 23 are formed in a square shape (or a rectangular shape). In the case of a rectangular shape, though there is no particular limitation on the ratio of the length and the width thereof, it is usually desired that the length:width=about 1:0.5 to about 1:2.0.

Figure 13:
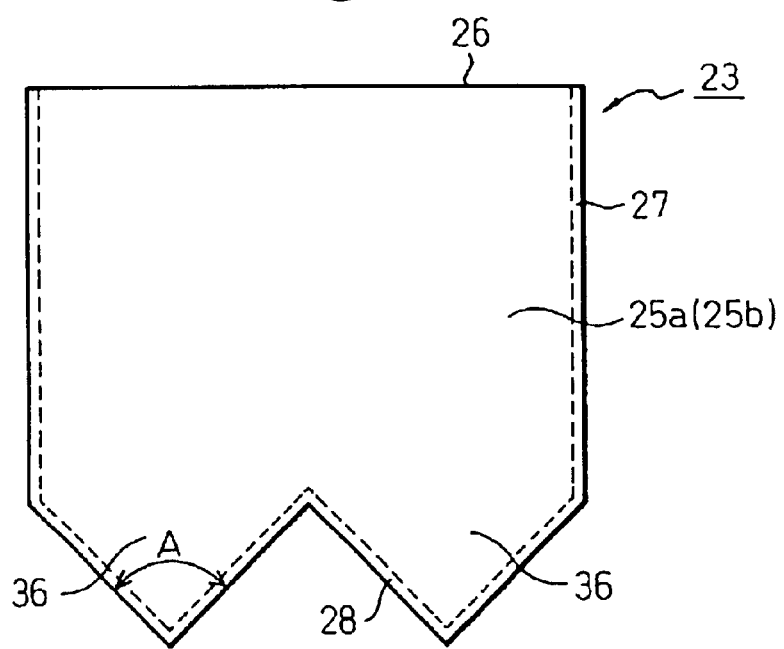
FIG. 13 is a front view illustrating another shape of the bag member of the extraction bag with support of the present invention.

In FIG. 13, the bottom edge portion of the bag member 23 is formed in a W-shape so as to possess two protruded portions 36 protruding downward to promote drainage of liquid during the extraction. Though there is no particular limitation, it is desired that the inner angle A of the protruded portions 36 is usually from about 85 to about 125 degrees.

Figure 14:
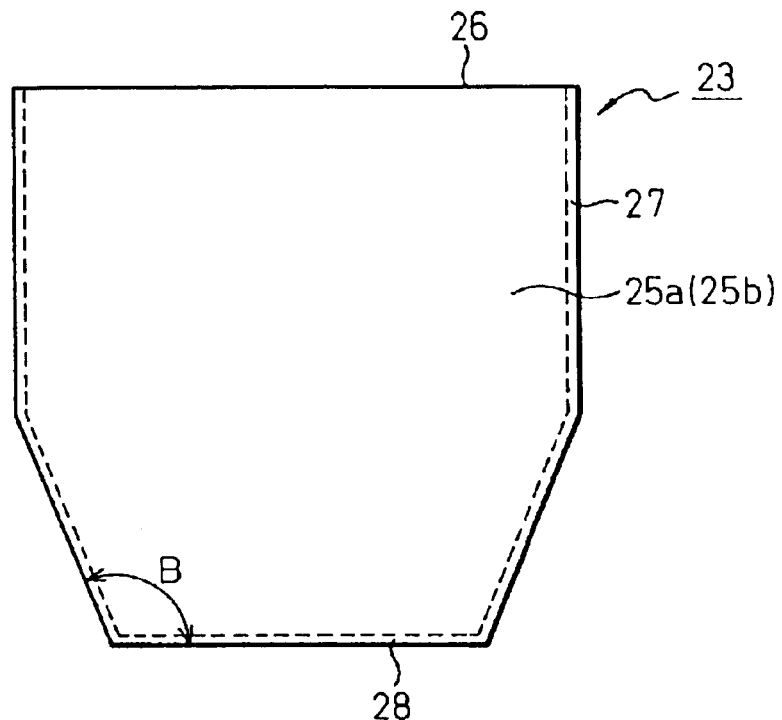
FIG. 14 is a front view illustrating a further shape of the bag member of the extraction bag with support of the present invention.

In FIG. 14, the lower half portions of both side edge portions 27 of the bag member 23 are bent inward, and the bottom edge portion 28 is formed flat. The bag member of this shape, too, is effective in improving the drainage of the liquid after the extraction. Though there is no particular limitation, it is desired that the inner angle B at both ends of the bottom edge portion 28 is usually from about 95 to about 125 degrees.

Figure 15:
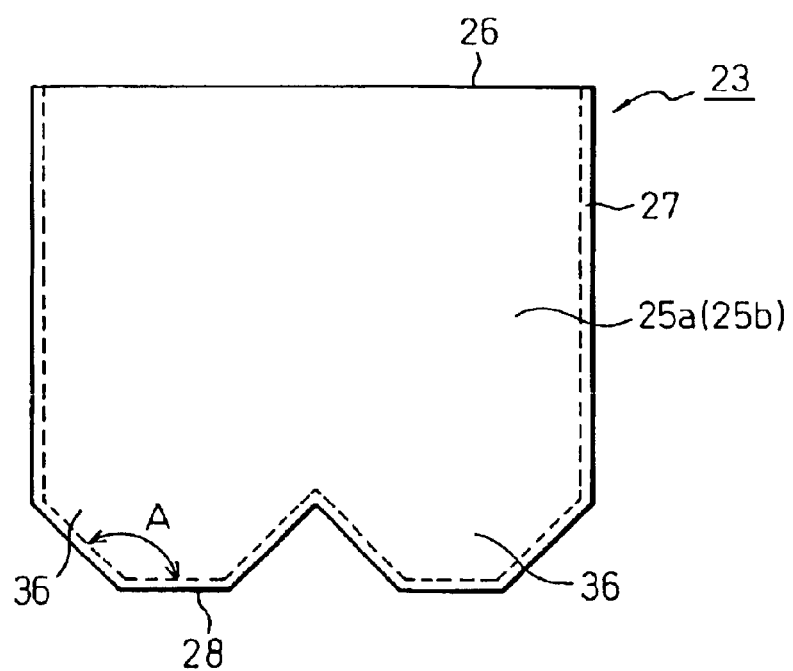
FIG. 15 is a front view illustrating a still further shape of the bag member of the extraction bag with support of the present invention.

In FIG. 15, two protruded members 36 are formed in a W-shape in the bottom of the bag member 23. The lower ends of the protruded members 36 are formed as straight bottom edge portions 28 nearly in parallel with the top edge 26 of the bag member. Though there is no particular limitation, it is desired that the inner angle at both ends of the bottom edge portions 28 is usually from about 95 to about 125 degrees.

Described below, with reference to the drawings, are the operation and state of executing the extraction by using the extraction bag with support of the present invention.

Figure 16:
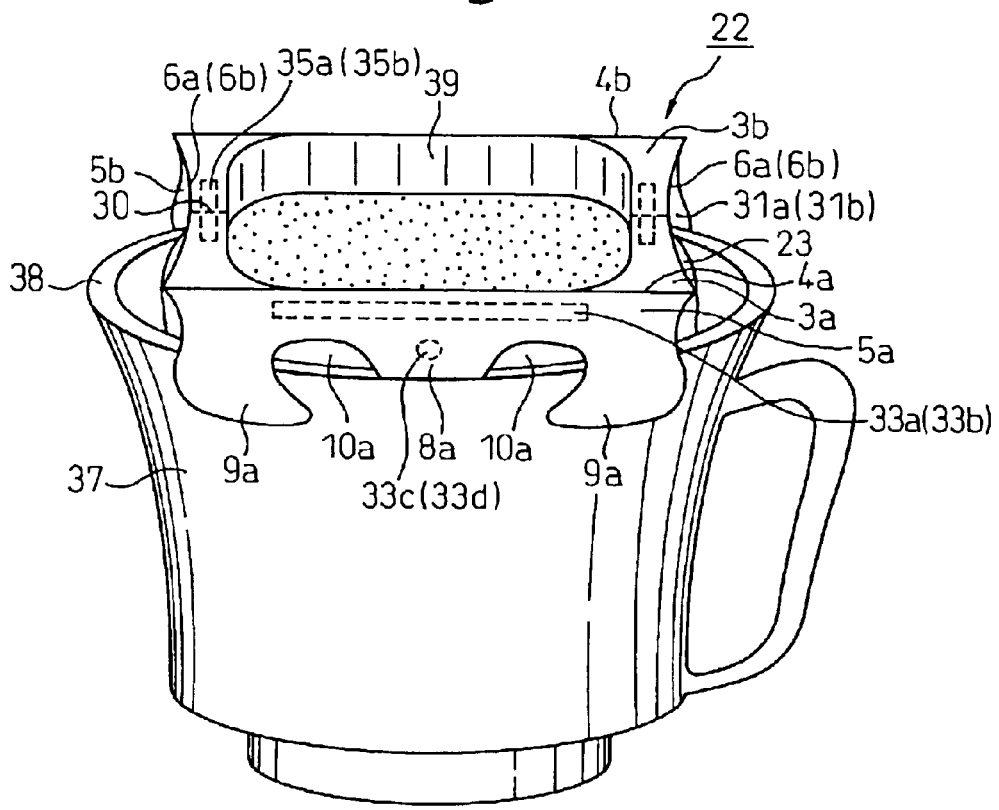
FIG. 16 is a perspective view illustrating a state where the extraction bag with support of the present invention is being used.
Figure 17:
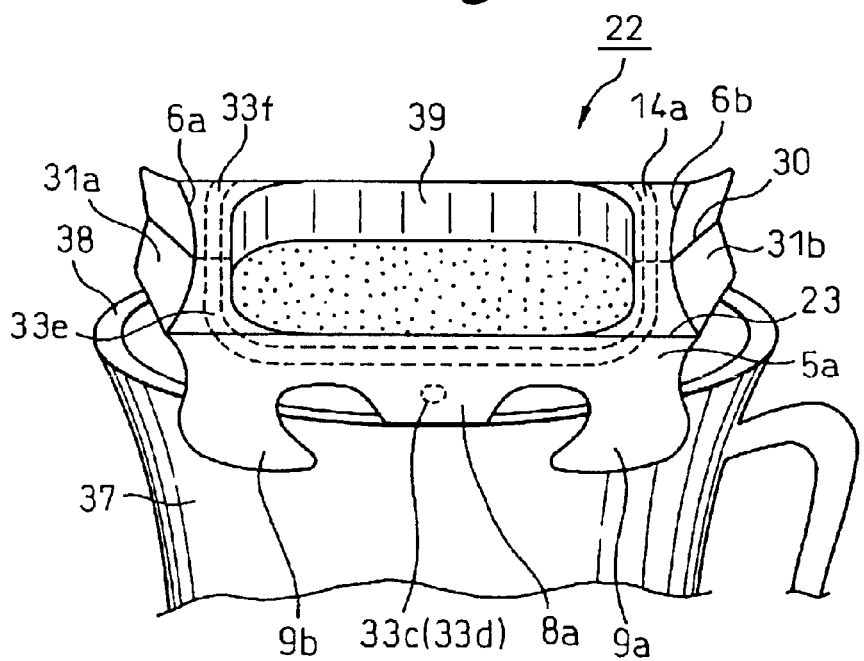
FIG. 17 is a perspective view illustrating another state where the extraction bag with support of the present invention is being used.

In FIG. 16, the extraction bag 22 with support is placed on the top edge 38 of the extraction container (cup) 37. To place it, the portions for cutting or tearing of the extraction bag with support and of the bag member are torn apart along the rows of perforations for cutting or tearing. This operation is usually effected for both the bag member and the support member. The operation, however, may be separately effected. They can be smoothly torn apart simultaneously if the support member and the bag member are joined together at the regions 34*a*, 34*b* where the portions for cutting and tearing are joined together and/or at the regions 35*a*, 35*b* between the rows of perforations for cutting or tearing and the push-bending lines. The portions for cutting or tearing of the support member may have been cut and torn away in advance to form a cavity. In this case, the portions for cutting or tearing in the head portions only of the bag member are easily cut and torn apart.

Next, the right and left push-bending portions 31*a* and 31*b* of the support member are pushed by the fingers so as to be bent up or bent down along the push-bending lines 6*a* and 6*b*. Then, as shown in FIG. 16 (pushed and bent down), the head portions 3*a* and 3*b* of the front and back face sections of the support member are pushed open toward both sides of the top edge 30. Then, the portions 32*a* and 32 for cutting or tearing in the head portions 3*a* and 3*b* are opened, and the portions for cutting or tearing in the bag member are opened, thereby to form an opening 39. At this time, as shown in FIG. 6, the bag member has been adhered together on the junction regions 33*a*, 33*b* in the leg portions 5*a*, 5*b* of the front and back face sections of the support member and, as required, on the regions 33*c* and 33*d* located thereunder. As the head portions are pushed open, therefore, the leg portions 5*a* and 5*b* of the support member are pulled by the bag member, and are folded down along the folding lines 4*a* and 4*b* to form a pair of support legs opposed to each other. The pair of support legs comprising leg portions are placed on the top edge of the extraction container (cup). The middle aprons 8*a* and 8*b* of the leg portions are inserted in the inside of the container (cup), the right and left side lower projections 9a and 9b are positioned on the outer side of the container, and the top edge 38 of the container is inserted in the dents 10a and 10b, so that the support member engages with the top edge of the extraction container and is stably held thereby.

At this time, the bag member is joined to the support member on the junction regions in the leg portions, and is further joined, as required, to the support member at the regions 35a, 35b located between the rows of perforations for cutting or tearing and the push-bending lines. Therefore, the bag member that is opened is stably held in a hanging manner by the support member that is pushed open together with the material to be extracted contained therein.

The right and left push-bending portions 31a and 31b of the support member may be pushed and bent upward along the push-bending lines 6a and 6b. The push-bending portions 31a and 31b pushed up, the front and back face sections 3a and 3b of the support members, and the head portions of the bag member adhered thereto, are pushed open toward both sides of the top edge 30 to thereby form the opening 39.

When the material to be extracted has been contained in the extraction bag with support placed on the container, a predetermined extraction solution such as hot water may be poured into the opening to extract the material in the bag member. Then, the extract is filtered through the bag member and flows down into the container. When the material to be extracted has not been contained in the extraction bag with support, the extraction bag is filled with a desired material to be extracted in a desired amount through the opening, and the same extraction operation is performed.

In tearing the support member and the bag member apart along the rows of perforations for cutting or tearing, the portions for cutting or tearing of the support member are not completely removed but instead, some portions of the rows of perforations are left, e.g., either the right end or the left end thereof is left and is folded toward the outside of the opening, while the portions for cutting or tearing of the bag member are completely removed. After the extracting solution (hot water) is poured, the portions for cutting or tearing of the support member are used as a closure to cover the opening, thereby to maintain the temperature and to effect the steaming for the material to be extracted that is heated by the extracting solution (hot water).

The water-permeable filtering sheet forming the bag member of the present invention can be selected from a filtering paper, a filtering cloth and a filtering non-woven fabric (polyolefin ultrafine fibers such as polyethylene ultrafine fiber and polypropylene ultrafine fiber, polyester ultrafine fiber, and a water-permeable filtering nonwoven fabric produced from mixed fibers of these fibers and a hydrophilic fiber that is usually used for filtering).

In the present invention, further, the water-resistant sheet forming the support member is selected from sheet materials that are not softened or deformed even when they are brought into contact with the extract at the time of effecting the extraction, and that can be cut or torn by fingers. As such sheet materials, there can be used a paper coated with a water-proof film of a thickness of 30 to 300 $\mu$m, a plastic sheet and a porous polyolefin resin sheet.

To adhere the bag member and the support member together, it is desired that at least either the bag member or the support member is melt-adhered. An adhesive may be used. Though there is no particular limitation on the kind of the adhesive, it is usually desired to use a water-resistant adhesive and, particularly, to use a harmless water-resistant adhesive.

There is no particular limitation on the material to be extracted that is contained in the extraction bag with support of the present invention provided it can be extracted. For example, there can be contained a coffee powder, green tea, black tea, various kinds of Chinese tea, herb tea as well as various nourishing agents that can be extracted.

INDUSTRIAL APPLICABILITY

By using the sheet composite of the present invention, the extraction bag with support containing or without containing a material to be extracted is easily and efficiently formed through one step, enabling the material to be filled therein to be extracted. By using the extraction bag with support of the present invention, the material to be extracted contained therein is safely and stably extracted. Or, the material to be extracted is filled therein, and is safely and stably extracted.

What is claimed is:

1. An extraction bag with support comprising:

a bag member formed from a water-permeable filtering sheet for containing a material to be extracted; and a support member formed from a water-resistant sheet for forming a support for said bag member;

wherein said bag member has front and back face sections formed by folding said water-permeable filtering sheet into halves along a center line thereof, said front and back face sections continuing to each other at a common top edge thereof, and being joined and sealed together at both their side edge portions and bottom edge portions;

said support member is folded into halves along the center line thereof, and has front and back face sections overlapped on the outer sides of the front and back face sections of said bag member, the front and back face sections of said support member continuing to each other at a common top edge thereof, symmetrical to each other, the common top edge of said support member being overlapped on the common top edge of said bag member, and a maximum width of said bag member being larger than a maximum width of said support member;

the front and back face sections of said support member are sectionalized into head and leg portions due to folding lines formed in the direction of width thereof, and said head and leg portions can be folded along said folding lines;

arcuate push-bending lines are formed at the right and left edges of the continuing head portions of the front and back face sections of said support member passing through said common top edges and reaching the right and left ends of said folding lines, and right and left push-bending portions are formed on the outer sides of the right and left push-bending lines;

arcuate rows of perforations for cutting or tearing are formed in the continuing head portions of the front and back face sections of said support member on the inside of said right and left push-bending lines over the front and back face sections of said support member and over the front and back face sections of said bag member held therebetween, so as to be separated away from said right and left push-bending lines, portions for cutting or tearing are formed on the inside of said rows of perforations for cutting or tearing, or the portions for cutting or tearing of the front and back face sections of said support member are cut and torn away, and said arcuate perforations for cutting or tearing are formed in the front and back face sections of said bag member only;

the front and back face sections of said support member and the front and back face sections of said bag member in contact thereto are joined together in at least one region of the leg portions; and the portions for cutting and tearing of said bag member and of said support member, or only the portion for cutting and tearing of said bag member when the portions for cutting and tearing of said support member have been cut and torn away, are cut and torn apart along said rows of perforations for cutting or tearing, the right and left push-bending portions in the upper portion of said support member are pushed up or pushed down inwardly along said push-bending lines, whereby the two continuing head portions of the front and back face sections of said support member are push-opened toward both sides of said common top edge, and said portions for cutting or tearing of the bag member are opened and the leg portions of the front and back face sections of said support member are folded down from the push-opened head portions along said transverse folding lines, and whereby the leg portions of the support member supporting the opened bag member are allowed to be placed on the extraction container and the material to be extracted is allowed to be contained in said bag member.

2. An extraction bag with support according to claim 1, wherein downwardly extending middle aprons are formed at the central portions at the lower ends of the leg portions of said front and back face sections of said support member.

3. An extraction bag with support according to claim 1, wherein downwardly extending right and left side lower projections are formed at both the right and left lower ends of the leg portions of said front and back face sections of said support member.

4. An extraction bag with support according to claim 1, wherein downwardly extending middle aprons are formed at the central portions at the lower ends of the leg portions of said front and back face sections of said support members, downwardly extending right and left side lower projections are formed at both the right and left ends of said leg portions, and said right and left side lower projections are forming dents with respect to said middle aprons.

5. An extraction bag with support according to claim 1, wherein one or more dents are formed in the central portions of the middle aprons of the front and back face sections of said support member.

6. An extraction bag with support according to claim 1, wherein said front and back face sections of said bag member have a square or rectangular shape.

7. An extraction bag with support according to claim 1, wherein the bottom edge of said bag member is formed straight, and the width of the bottom edge is smaller than the width of the common top edge of said bag member.

8. An extraction bag with support according to claim 1, wherein two projections are formed on the bottom edge of said bag member, and the distance between the ends of the two projections is smaller than the width of the common top edge of said bag member.

9. An extraction bag with support containing a material to be extracted comprising:

a bag member made of a water-permeable filtering sheet for containing a material to be extracted; and a support member made of a water-resistant sheet for forming a support for said bag member; wherein said bag member has front and back face sections formed by folding said water-permeable filtering sheet into halves along a center line thereof, said front and back face sections being continuous with each other at their top edges thereof, and being joined and sealed together at both their side edge portions and bottom edge portion;

said support member is folded into halves along the center line thereof, and has front and back face sections overlapped on the outer sides of the front and back face sections of said bag member, the front and back face sections of said support member continuing to each other at the top edge thereof, symmetrical to each other, the common top end of said support member being overlapped on the common top edge of said bag member, and a maximum width of said bag member being larger than a maximum width of said support member;

the front and back face sections of said support member are sectionalized into head and leg portions due to folding lines formed in the direction of width thereof, and said head and leg portions can be folded along said folding lines;

arcuate push-bending lines are formed at the right and left edges of the continuing head portions of the front and back face sections of said support member passing through said top edges and reaching the right and left ends of said folding lines, and right and left push-bending portions are formed on the outer sides of the right and left push-bending lines;

arcuate rows of perforations for cutting or tearing are formed in the continuing head portions of the front and back face sections of said support member on the inside of said right and left push-bending lines over the front and back face sections of said support member and over the front and back face sections of said bag member held therebetween, so as to be separated away from said right and left push-bending lines, portions for cutting or tearing are formed on the inside of said rows of perforations for cutting or tearing, or the portions for cutting or tearing of the front and back face sections of said support member are cut and torn away, and said arcuate perforations for cutting or tearing are formed in the front and back face sections of said bag member only;

the front and back face sections of said support member and the front and back face sections of said bag member in contact thereto are joined together on at least one region of the leg portions; and the portions for cutting and tearing of said bag member containing said material to be extracted and of said support member are cut and torn apart along said rows of perforations for cutting or tearing, or the portion for cutting and tearing of said bag member only is cut and torn apart along said row of perforations for cutting or tearing when the portions for cutting and tearing of said support member have been cut and torn away, the right and left push-bending portions at upper portions of said support member are pushed up or pushed down inwardly along said push-bending lines, so that the two continuing head portions of the front and back face sections of said support member are push-opened toward both sides of said common top edge, that said portions for cutting or tearing of the bag member are opened and that the leg portions of the front and back face sections of said support member are folded down from the push-opened head portions along said transverse folding lines, whereby the leg portions of the support member supporting the opened bag member are allowed to be placed on the extraction container.

10. An extraction bag with support containing a material to be extracted according to claim 9, wherein downwardly extending middle aprons are formed at the central portions at the lower ends of the leg portions of said front and back face sections of said support member.

11. An extraction bag with support containing a material to be extracted according to claim 9, wherein downwardly extending right and left side lower projections are formed at both the right and left lower ends of the leg portions of said front and back face sections of said support member.

12. An extraction bag with support containing a material to be extracted according to claim 9, wherein downwardly extending middle aprons are formed at the central portions at the lower ends of the leg portions of said front and back face sections of said support member, downwardly extending right and left side lower projections are formed at both the right and left ends of said leg portions, and said right and left side lower projections form dents with respect to said middle aprons.

13. An extraction bag with support containing a material to be extracted according to claim 10, wherein one or more dents are formed in the central portion of the middle aprons of the front and back face sections of said support member.

14. An extraction bag with support containing a material to be extracted according to claim 9, wherein the front and back face sections of said bag member have a square or rectangular shape.

15. An extraction bag with support containing a material to be extracted according to claim 9, wherein the bottom edge of said bag member is formed straight, and the width of the bottom edge is smaller than the width of the common top edge of said bag member.

16. An extraction bag with support containing a material to be extracted according to claim 9, wherein two projections are formed on the bottom edge of said bag member, and the distance between the ends of the two projections is smaller than the width of the common top edge of said bag member.

17. A sheet composite for producing an extraction bag with support comprising:
   a water-permeable filtering sheet member; and
   a plurality of support members arranged on the sheet member in the lengthwise direction thereof maintaining a distance; wherein
      said support members are each constituted by two symmetrical half portions on both sides of a center line thereof, the support members being arranged on said sheet member in such a manner that the center lines thereof are in agreement with the center line of said sheet member in the lengthwise direction thereof;
      the two half portions of said support members are continuing to each other along the center lines;
   wherein when the center lines are oriented in the horizontal direction and when the half portions are viewed in such a manner that said center lines form top edges of the half portions:
      (1) each half portion includes a head portion close to the top edge (center line), a folding line formed in parallel with the top edge, and a leg portion continuous with said top portion via the folding line;
      (2) arcuate push-bending lines are formed at the right and left ends of the head portion of each half portion extending inward from the right and left ends of said folding line, the arcuate push-bending lines continuing to each other at said top edge;
      (3) arcuate rows of perforations are formed in said head portion of each half portion on the inside of the right and left arcuate push-bending lines penetrating through said support members and through said sheet member so as to be separated away from said push-bending lines, the rows of perforations in each half portion are continuous with each other at the top edge so as to form an arcuate row of perforations for cutting or tearing, a portion for cutting or tearing is formed on the inside of the arcuate rows of perforation for cutting or tearing, or the portion for cutting or tearing of said support member is cut and torn away, and said row of perforations is formed in the sheet member only; and
      (4) each half portion of the support member and said sheet member are joined to each other in at least one region of said leg portion.

18. A sheet composite according to claim 17, wherein outwardly extending middle aprons are formed at the central portions at the outer ends of the leg portions of the two half portions of said support members.

19. A sheet composite according to claim 17, wherein outwardly extending right and left side lower projections are formed at both the right and left outer ends of said leg portions of the two half portions of said support member.

20. A sheet composite according to claim 17, wherein downwardly extending middle aprons are formed at the central portions at the lower ends of the leg portions of said front and back face sections of said support members, downwardly extending right and left side lower projections are formed at both the right and left ends of said leg portions, and said right and left side lower projections form dents with respect to said middle aprons.

21. A sheet composite according to claim 18, wherein one or more dents are formed in the central portions of the middle apron at the front and back face of said sections of said support members.

* * * * *